United States Patent
Szuromi et al.

(10) Patent No.: US 8,506,836 B2
(45) Date of Patent: Aug. 13, 2013

(54) METHODS FOR MANUFACTURING COMPONENTS FROM ARTICLES FORMED BY ADDITIVE-MANUFACTURING PROCESSES

(75) Inventors: Andy Szuromi, Phoenix, AZ (US); Daniel Ryan, Phoenix, AZ (US); Donald G. Godfrey, Phoenix, AZ (US); Mark C. Morris, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 13/235,210

(22) Filed: Sep. 16, 2011

(65) Prior Publication Data

US 2013/0071562 A1    Mar. 21, 2013

(51) Int. Cl.
- C23F 1/00 (2006.01)
- C03C 15/00 (2006.01)
- C03C 25/68 (2006.01)
- C25F 3/00 (2006.01)

(52) U.S. Cl.
USPC ............................. 216/102; 216/103

(58) Field of Classification Search
USPC .............................. 216/102, 103
See application file for complete search history.

(56) References Cited

U.S. PATENT DOCUMENTS

| | | |
|---|---|---|
| 4,145,481 A | 3/1979 | Gupta et al. |
| 4,198,442 A | 4/1980 | Gupta et al. |
| 4,382,976 A | 5/1983 | Restall |
| RE31,339 E | 8/1983 | Dardi et al. |
| 4,499,048 A | 2/1985 | Hanejko |
| 4,687,678 A | 8/1987 | Lindblom |
| 5,096,518 A | 3/1992 | Fujikawa et al. |
| 5,106,266 A | 4/1992 | Borns et al. |
| 5,128,179 A | 7/1992 | Baldi |
| 5,236,116 A | 8/1993 | Solanki et al. |
| 5,249,785 A | 10/1993 | Nelson et al. |
| 5,465,780 A | 11/1995 | Muntner et al. |
| 5,514,482 A | 5/1996 | Strangman |
| 5,640,667 A | 6/1997 | Freitag et al. |
| 5,650,235 A | 7/1997 | McMordie et al. |

(Continued)

FOREIGN PATENT DOCUMENTS

| | | |
|---|---|---|
| DE | 2104062 A1 | 8/1972 |
| EP | 0861919 A2 | 9/1998 |
| GB | 2279667 A | 1/1995 |
| JP | 5104259 A | 4/1993 |

OTHER PUBLICATIONS

Godfrey, D. G., et al.: "Multi-Material Turbine Components" filed with the USPTO on Jan. 27, 2012 and assigned U.S. Appl. No. 13/360,126.

(Continued)

*Primary Examiner* — Roberts Culbert
(74) *Attorney, Agent, or Firm* — Ingrassia Fisher & Lorenz, P.C.

(57) ABSTRACT

A method is provided for manufacturing a component. The method includes forming a diffusion coating on a first intermediate article formed by an additive manufacturing process. The diffusion coating is removed from the first intermediate article forming a second intermediate article having at least one enhanced surface. The diffusion coating is formed by applying a layer of coating material on at least one surface of the first intermediate article and diffusion heat treating the first intermediate article and the layer. The diffusion coating comprises a surface additive layer and a diffusion layer below the surface additive layer. The formation of the diffusion coating and removal thereof may be repeated at least once.

20 Claims, 13 Drawing Sheets

(56) References Cited

U.S. PATENT DOCUMENTS

| | | |
|---|---|---|
| 5,745,834 A | 4/1998 | Bampton et al. |
| 5,837,960 A | 11/1998 | Lewis et al. |
| 5,947,179 A | 9/1999 | Kinane et al. |
| 6,049,978 A | 4/2000 | Arnold |
| 6,154,959 A | 12/2000 | Goodwater et al. |
| 6,172,327 B1 | 1/2001 | Aleshin et al. |
| 6,174,448 B1 | 1/2001 | Das et al. |
| 6,269,540 B1 | 8/2001 | Islam et al. |
| 6,270,914 B1 | 8/2001 | Ogasawara et al. |
| 6,355,116 B1 | 3/2002 | Chen et al. |
| 6,485,848 B1 | 11/2002 | Wang et al. |
| 6,504,127 B1 | 1/2003 | McGregor et al. |
| 6,568,077 B1 | 5/2003 | Hellemann et al. |
| 6,575,349 B2 | 6/2003 | Van Esch |
| 6,676,892 B2 | 1/2004 | Das et al. |
| 6,758,914 B2 | 7/2004 | Kool et al. |
| 6,838,191 B1 | 1/2005 | Raj |
| 6,884,461 B2 | 4/2005 | Ackerman et al. |
| 6,969,457 B2 | 11/2005 | MacDonald et al. |
| 7,216,428 B2 | 5/2007 | Memmen et al. |
| 7,270,764 B2 | 9/2007 | Wustman et al. |
| 7,651,658 B2 | 1/2010 | Aimone et al. |
| 7,794,800 B2 | 9/2010 | Clark et al. |
| 7,829,142 B2 | 11/2010 | Kool et al. |
| 2003/0037436 A1 | 2/2003 | Ducotey, Jr. et al. |
| 2003/0088980 A1 | 5/2003 | Arnold |
| 2005/0036892 A1 | 2/2005 | Bajan |
| 2005/0091848 A1 | 5/2005 | Nenov et al. |
| 2006/0177582 A1 | 8/2006 | Chandra et al. |
| 2006/0222776 A1 | 10/2006 | Madhava et al. |
| 2007/0084047 A1 | 4/2007 | Lange et al. |
| 2008/0014457 A1 | 1/2008 | Gennaro et al. |
| 2008/0290215 A1 | 11/2008 | Udall et al. |
| 2008/0304975 A1 | 12/2008 | Clark et al. |
| 2009/0200275 A1 | 8/2009 | Twelves et al. |
| 2009/0255602 A1 | 10/2009 | McMasters et al. |
| 2010/0021289 A1 | 1/2010 | Grylls et al. |
| 2010/0025001 A1 | 2/2010 | Lee et al. |
| 2010/0028158 A1 | 2/2010 | Richter |
| 2010/0065142 A1 | 3/2010 | McMasters et al. |
| 2010/0200189 A1 | 8/2010 | Qi et al. |
| 2010/0221567 A1 | 9/2010 | Budinger et al. |
| 2011/0106290 A1 | 5/2011 | Hövel et al. |
| 2011/0135952 A1 | 6/2011 | Morris et al. |
| 2011/0311389 A1 | 12/2011 | Ryan et al. |

OTHER PUBLICATIONS

Mittendorf, et al.; Methods for Repairing Turbine Components, U.S. Appl. No. 13/041,113, filed Mar. 4, 2011.

EP Search Report for Application No. 12 184 142.3 dated Feb. 6, 2013.

USPTO Office Action for U.S. Appl. No. 13/041,113 dated May 23, 2013.

Hussain et al.; Advanced Nanocomposites for High Temperature Aero-Engine/Turbine Components, Inderscience Publishers, International Journal of Nanomanufacturing; vol. 4, No. 1-4, 2009, pp. 248-256. Retrieved from Internet: <URL:www.inderscience.com>.

Mainier et al.; On the Effect of the Electroless Nickel-Phosphorus Coating Defects on the Performance of This Type of Coating in Oilfieled Environments, OnePetro, SPE Advanced Technology Series; vol. 2, No. 1, Mar. 1994.

Bi et al.; Feasibility Study on the Laser Aided Additive Manufacturing of Die Inserts for Liquid Forging, ScienceDirect, Oct. 25, 2009.

Groth et al.; New Innovations in Diode Laser Cladding, Fraunhofer USA-Center for Surface and Laser Processing, Oct. 27, 2009.

Clark et al.; Shaped Metal Deposition of a Nickel Alloy for Aero Engine Applications, SciencetDirect, Oct. 27, 2007.

Electroless Nickel, New Hampshire Materials Laboratory, Inc.

USPTO Non-final Office Action for U.S. Appl. No. 12/820,652; notification date Mar. 16, 2012.

Loeber, L., et al.; Comparison of Selective Laser and Electron Beam Melted Titanium Aluminides, published Sep. 24, 2011, pp. 547-556.

Ryan, et al.; Methods for Manufacturing Turbine Components, filed with the USPTO on Jun. 22, 2010 and assigned U.S. Appl. No. 12/820,652.

USPTO Final Office Action for U.S. Appl. No. 12/820,652; notification date Jul. 13, 2012.

Godfrey, D. G. et al.: Titanium Aluminide Components and Methods for Manufacturing the Same from Articles Formed by Consolidation Processes, Filed with the USPTO on Aug. 1, 2012 and assigned U.S. Appl. No. 13/564,656.

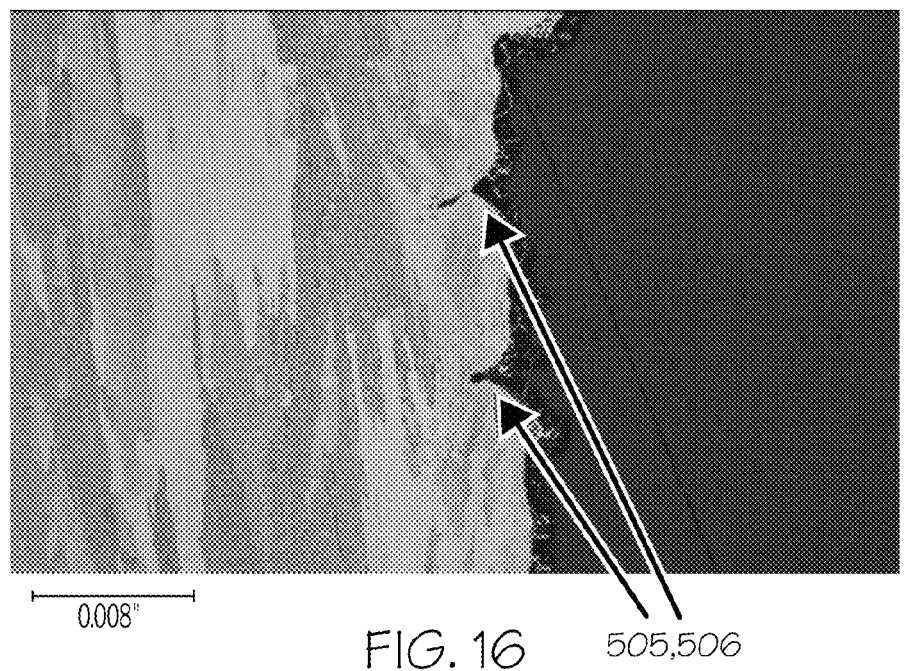
FIG. 16    505,506
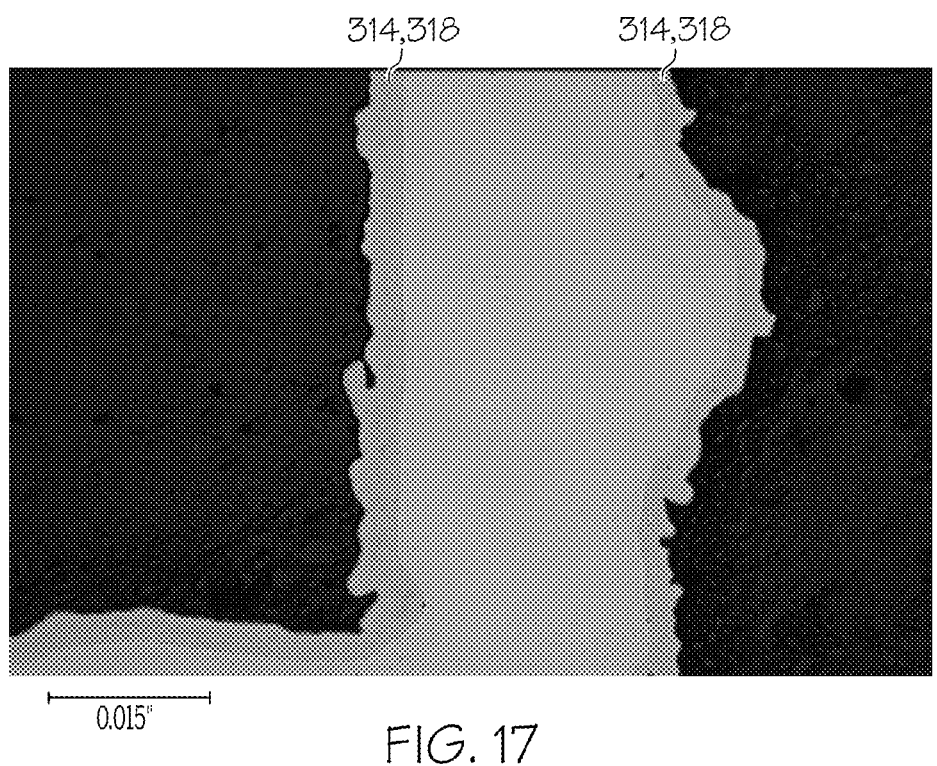
FIG. 17

METHODS FOR MANUFACTURING COMPONENTS FROM ARTICLES FORMED BY ADDITIVE-MANUFACTURING PROCESSES

TECHNICAL FIELD

The present invention generally relates to methods for manufacturing components, and more particularly relates to methods for manufacturing components from articles formed by additive-manufacturing processes.

BACKGROUND

Components with relatively complex three-dimensional (3D) geometries raise difficult fabrication issues. Conventional fabrication techniques include forging, casting, and/or machining. Such conventional methods are not only expensive and have long lead-times, but may additionally have low yields. Development time and cost for certain components may also be magnified because such components generally require several iterations, including iterations as a result of intentional design decisions.

Additive manufacturing (AM) processes (including those which form "cores" for subsequent conventional casting) have been developed to fabricate components having relatively complex three dimensional geometries, including components with internal surfaces defining internal passages including internal hollow areas, internal channels, internal openings or the like (collectively referred to herein as "internal passages") for cooling, weight reduction, or otherwise. Additive Manufacturing (AM) is defined by the American Society for Testing and Materials (ASTM) as the "process of joining materials to make objects from 3D model data, usually layer upon layer, as opposed to subtractive manufacturing methodologies, such as traditional machining and casting." In an additive-manufacturing process, a model, such as a design model, of the component may be defined in any suitable manner For example, the model may be designed with computer aided design (CAD) software. The model may include 3D numeric coordinates of the entire configuration of the component including both external and internal surfaces. The model may include a number of successive 2D cross-sectional slices that together form the 3D component.

Components manufactured from additive manufacturing processes may have significant surface roughness, surface porosity and cracks (hereinafter "surface-connected defects"), and internal porosity and cracks (hereinafter "internal defects"). The term "internal defects" also includes bond failures and cracks at the interfaces between successive cross-sectional deposit layers. Cracks may develop at these interfaces or cut through or across deposit layers dues to stresses inherent with the additive manufacturing process and/or the metallurgy of the build material.

A hot isostatic pressing (HIP) process may be used to eliminate internal defects but not the surface-connected defects. For components needing HIP because of the presence of internal defects, an encapsulation process may be used to bridge and cover the surface-connected defects, effectively converting the surface-connected defects into internal defects in preparation for subsequent hot isostatic pressing (HIP) processing. However, for components with significant surface roughness, the encapsulation process may not sufficiently bridge and cover the surface-connected defects. Surface roughness may also be objectionable to customer perception of quality and may interfere with the functionality of the component. For example, excessive surface roughness may restrict or impede airflow, collect debris, act as a stress riser, and otherwise detract from the component design.

Unfortunately, the reduction of internal passage surface roughness presents a particular manufacturing challenge because of the general inaccessibility of the internal passage surfaces. Conventional polishing or milling techniques to reduce internal passage surface roughness are not as developed as they are for external surfaces. No effective process exists to uniformly reduce internal passage surface roughness to acceptable levels, thereby compromising the structural integrity, cosmetic appearance, functionality, and mechanical properties of the component, and also not allowing the encapsulation process to sufficiently bridge and cover the surface-connected defects in preparation for HIP processing. Even with encapsulation, faying surfaces of some surface-connected defects may not be sufficiently metallurgically diffusion bonded if excessively oxidized or otherwise insufficiently cleaned. A component with inadequate diffusion bonded surfaces has a compromised metallurgical surface integrity that reduces the overall metallurgical quality of the manufactured component.

Accordingly, it is desirable to provide methods for manufacturing components from articles formed by additive-manufacturing processes. It is also desirable to provide methods that uniformly reduce surface roughness, including internal passage surface roughness, thereby improving the structural integrity, cosmetic appearance, functionality, mechanical properties, and fatigue life/strength of the component, that allow encapsulation of the additive-manufactured article to be effective in preparation for subsequent hot isostatic pressing (HIP) processing, and that improve metallurgical quality of the component. It is also desirable to provide methods for manufacturing components that improve yield, enable improved development cycle times and reduced tooling costs without sacrificing component performance or durability, enable multiple design iterations at relatively low cost and short delivery times, and permit internal configurations for components not otherwise possible with current casting technology. Furthermore, other desirable features and characteristics of the present invention will become apparent from the subsequent detailed description of the invention and the appended claims, taken in conjunction with the accompanying drawings and this background of the invention.

BRIEF SUMMARY

Methods are provided for manufacturing a component. In accordance with one exemplary embodiment, the method comprises forming a diffusion coating on a first intermediate article formed by an additive manufacturing process. The diffusion coating is removed from the first intermediate article forming a second intermediate article having at least one enhanced surface.

Methods are provided for manufacturing a component from a first intermediate article formed by an additive manufacturing process in accordance with yet another exemplary embodiment of the present invention. The method comprises applying a coating material layer on at least one surface of the first intermediate article. The first intermediate article and the coating material layer are diffusion heat treated to form a diffusion coating comprising a surface additive layer and a diffusion layer below the surface additive layer. The diffusion layer includes an upper portion of a substrate of the first intermediate article. The diffusion coating including the upper portion of the substrate from the first intermediate article is removed forming a second intermediate article having at least one enhanced surface. The applying, diffusion heat treating, and removing steps are optionally repeated at least once.

Methods are provided for manufacturing a component from a first intermediate article formed by an additive manufacturing process in accordance with yet another exemplary embodiment of the present invention. The first intermediate article is comprised of a substrate and has at least one surface. The method comprises applying an aluminum-containing coating material layer on the at least one surface, the substrate comprising a nickel-based superalloy. The first intermediate article and the aluminum-containing coating material layer are diffusion heat treated to yield an aluminide diffusion coating on the first intermediate article. The aluminide diffusion coating comprises an aluminum-rich surface additive layer and a diffusion layer below the aluminum-rich surface additive layer. The diffusion layer includes an upper portion of the substrate. The aluminide diffusion coating is removed from the first intermediate article thereby forming a second intermediate article having at least one enhanced surface. The applying, diffusion heat treating, and removing steps are optionally repeated at least once.

BRIEF DESCRIPTION OF THE DRAWINGS

The present invention will hereinafter be described in conjunction with the following drawing figures, wherein like numerals denote like elements.

FIG. 16 is an image of a representative internal passage surface of the as-built HP turbine blade of FIG. 15, illustrating in more detail residual internal passage surface roughness and surface-connected defects; and FIG. 17 is an image of the internal passage surface of FIG. 16 after formation of an aluminide diffusion coating thereon but prior to coating removal, illustrating a coating diffusion boundary adapted to define an enhanced inner passage surface after subsequent removal of the aluminide diffusion coating.

DETAILED DESCRIPTION

Figure 1:
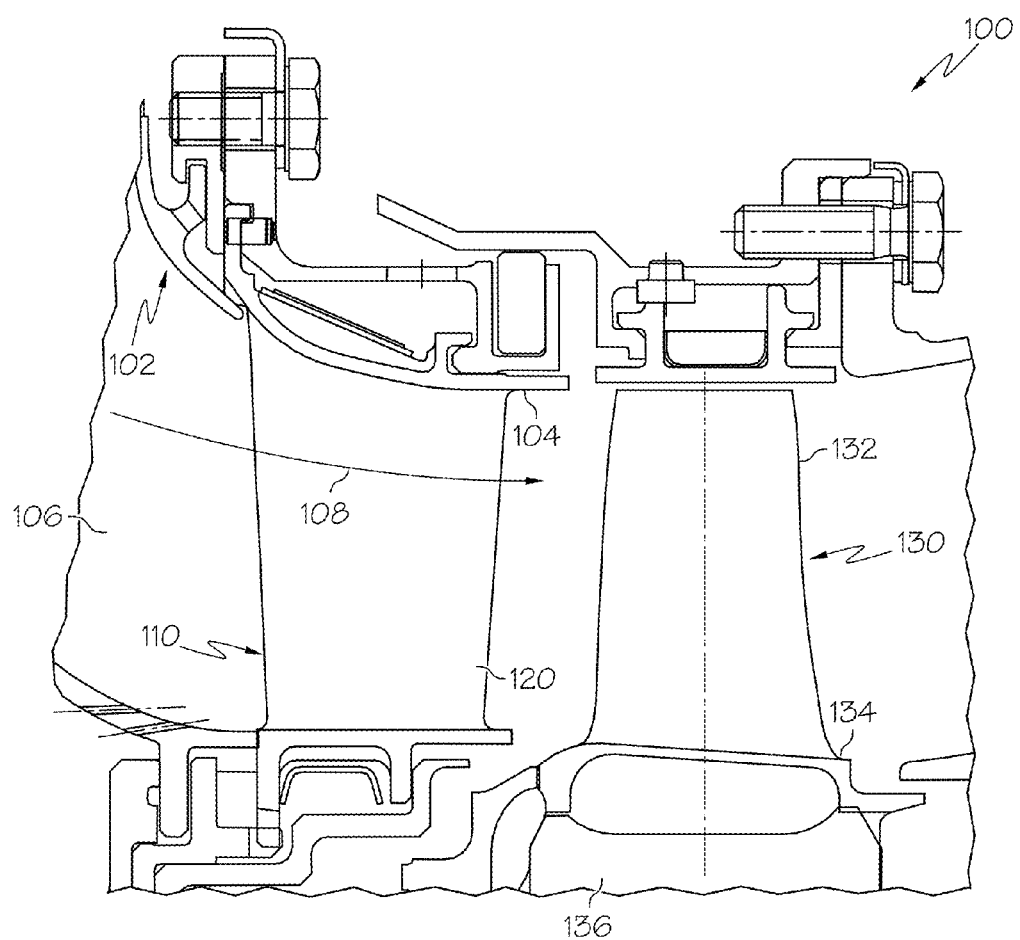
FIG. 1 is a partial cross-sectional view of a turbine section of an exemplary gas turbine engine assembly.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to methods for manufacturing components from articles formed by an additive manufacturing process such as electron beam melting or direct metal laser fusion in which sequential deposit layers of build material are fused and solidified according to a three-dimensional (3D) model. Other additive manufacturing processes may also be employed. The as-built article (hereinafter referred to as a "first intermediate article") may have significant surface roughness caused, for example, by partial fusion or entrainment of metallic powder as the laser starts or stops its traverse or sweep at the edges of the each deposit layer, and by contamination, debris, oxidation, or the like. The first intermediate article may also have internal porosity and cracks (hereinafter "internal defects") and surface porosity and cracks (hereinafter "surface-connected defects"). The term "internal defects" also includes "interface defects" such as bond failures and cracks at the interfaces between successive cross-sectional layers. The cracks develop at these interfaces or cut through or across deposit layers due to stresses inherent with the additive manufacturing process and/or the metallurgy of the build material. The term "surface-connected defects" as used herein includes porosity or cracks that are connected to the surface of the component. The surface-connected cracks have faying surfaces that may not be adequately metallurgically diffusion bonded. As used herein, the term "surface roughness" includes roughness at the surface (the intended sharp edge of the first intermediate article), near surface (the roughness associated with loosely adhered particles), and subsurface (the surface-connected defects contributing to roughness). The reduction in surface roughness improves the structural integrity, cosmetic appearance, functionality, fatigue life/strength, and mechanical properties of the component. Unfortunately, reduction of internal passage surface roughness presents a particular additive manufacturing challenge because of the general inaccessibility of the internal passage surfaces. As used herein, the term "internal passage" includes an internal hollow area, an internal channel, an internal opening or the like. According to exemplary embodiments as described herein, in a method for manufacturing a component, a diffusion coating is formed on the first intermediate article. The diffusion coating is formed by applying a layer of coating material (hereinafter "coating material layer") on a surface of the first intermediate article and diffusion heat treating the first intermediate article and the layer. The diffusion coating (including what remains of the coating material layer) is removed from the first intermediate article forming a second intermediate article having an enhanced surface. Formation and removal of the diffusion coating may be repeated at least once. As used herein, the term "enhanced" or the like refers to a reduction in surface roughness and/or improvement in metallurgical quality and the term "enhanced surface" includes an enhanced surface, near surface, and subsurface. The improvement in metallurgical quality results from removing surfaces that include surface-connected defects having inadequately metallurgically diffusion bonded faying surfaces. In an embodiment, the applied and diffused coating material layer also serves as an encapsulation layer to bridge and cover the surface-connected defects to effectively convert the surface-connected defects into internal defects that may be reduced or substantially eliminated by a hot isostatic pressing (HIP) process or other consolidation treatment, as hereinafter described. In another embodiment, the second intermediate article may be encapsulated by an encapsulation layer in a finishing step. In various embodiments, the HIP process may be concurrently performed with the diffusion heat treating step, subsequently performed in a finishing step, and at other times. These manufacturing methods yield a component with improved structural integrity, cosmetic appearance, functionality, metallurgical quality, and overall mechanical properties, including improved tensile and stress rupture strengths, improved fatigue life/strength, and improved manufacturing yield, enable improved development cycle times, reduce tooling costs without sacrificing component performance or durability, and permit internal configurations for components not otherwise possible with conventional fabrication techniques.

While the advantages of the present invention as described herein will be described with reference to a turbine component (a high pressure turbine blade shown in FIGS. 2, 4-5, and 10-17), the teachings of the present invention are generally applicable to any component manufactured from a first intermediate article formed by an additive manufacturing process and may be used to reduce surface roughness and/or improve metallurgical quality of the manufactured component. The teachings of the present invention are especially applicable to components manufactured from a first intermediate article formed by an additive manufacturing process, and that may include internal passages with relatively inaccessible rough internal surfaces (hereinafter "internal passage surfaces"). Exemplary components include, but are not limited to, turbine components, medical devices, weapons, and custom low volume components for internal combustion racing engines, etc.

FIG. 1 is a fragmented vertical sectional view illustrating a partial turbine section 100 of a gas turbine engine assembly in accordance with an exemplary embodiment. The turbine section 100 and gas turbine engine assembly have an overall construction and operation that is generally understood by persons skilled in the art. In general terms, the turbine section 100 has a housing 102 with an annular duct wall 104 that defines a mainstream hot gas flow path 106 for receiving a flow of mainstream combustion gases 108 from an engine combustor (not shown). The housing 102 additionally houses at least one stator assembly 110 with stator vanes 120 and at least one turbine rotor assembly 130 with turbine rotor blades 132. The rotor blades 132 of the turbine rotor assembly 130 project radially outward from a turbine rotor platform 134 that is coupled to a turbine disk 136, which in turn circumscribes a shaft (not shown). During operation, the combustion gases 108 flow past axially spaced circumferential rows of stator vanes 120 and rotor blades 132 to drive the rotor blades 132 and the associated turbine rotor assembly 130 for power extraction. Other embodiments may be differently arranged.

Figure 2:
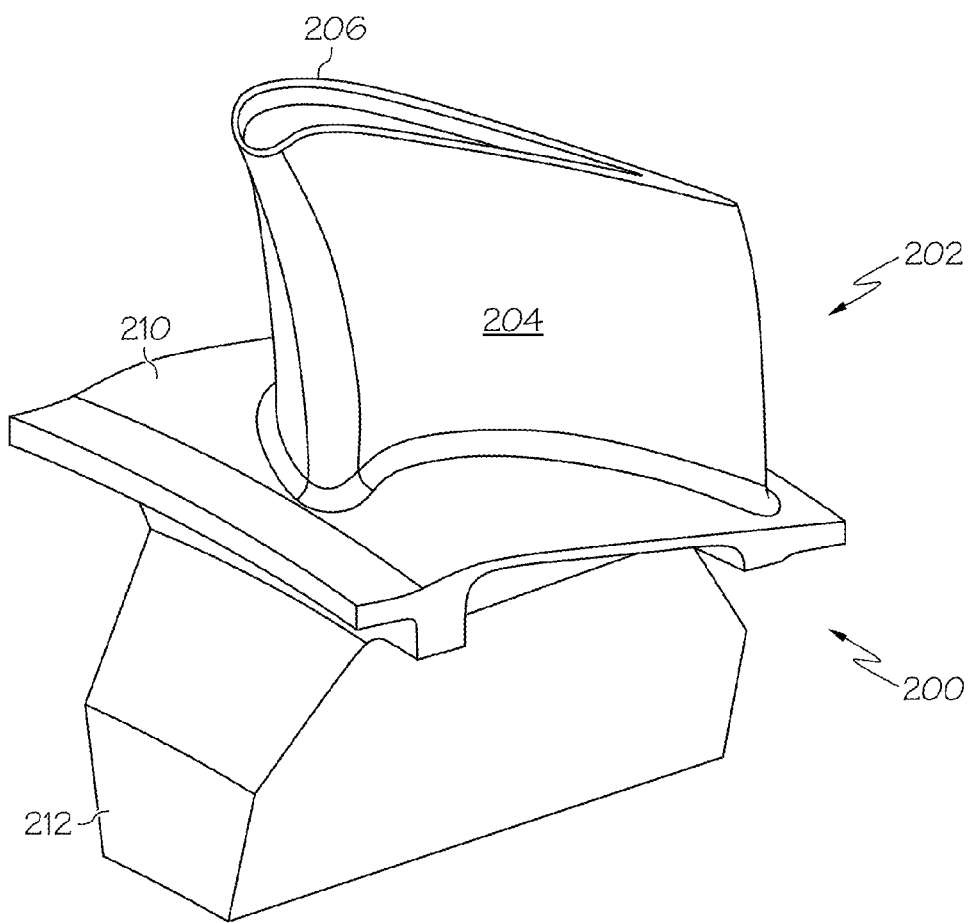
FIG. 2 is an isometric view of an exemplary turbine component.

FIG. 2 is an isometric view of a turbine component 200 in accordance with an exemplary embodiment and generally illustrates the relatively complex 3D geometric configuration typical of a turbine component, for example that may be incorporated into the turbine section 100 of FIG. 1. Although the turbine component 200 in FIG. 2 is depicted as a rotor blade, such as rotor blade 132 (FIG. 1), the exemplary embodiments discussed herein are applicable to any type of turbine component, such as stator vanes 120 (FIG. 1), and other engine components such as fan components, compressor components, and combustion components, as well as other components as noted above.

The turbine component 200 may include an airfoil 202 with a generally concave pressure side 204 and a generally convex suction side 206 opposed thereto. Each airfoil 202 may be coupled to a platform 210 that defines an inner boundary for the hot combustion gases that pass over airfoil 202 during engine operation. A mounting dovetail 212 may be integrally formed on the underside of the platform 210 for mounting the turbine component 200 within the turbine section 100 (FIG. 1). In an exemplary embodiment, the turbine component may include internal passages 502 (FIG. 5) to provide a cooling flow during engine operation. In this exemplary embodiment, the turbine component (FIG. 13) has a plurality of internal passages each with an internal surface 304a, and an external surface 304b. In other embodiments, the turbine component may be solid with only an external surface 304b.

Figure 3:
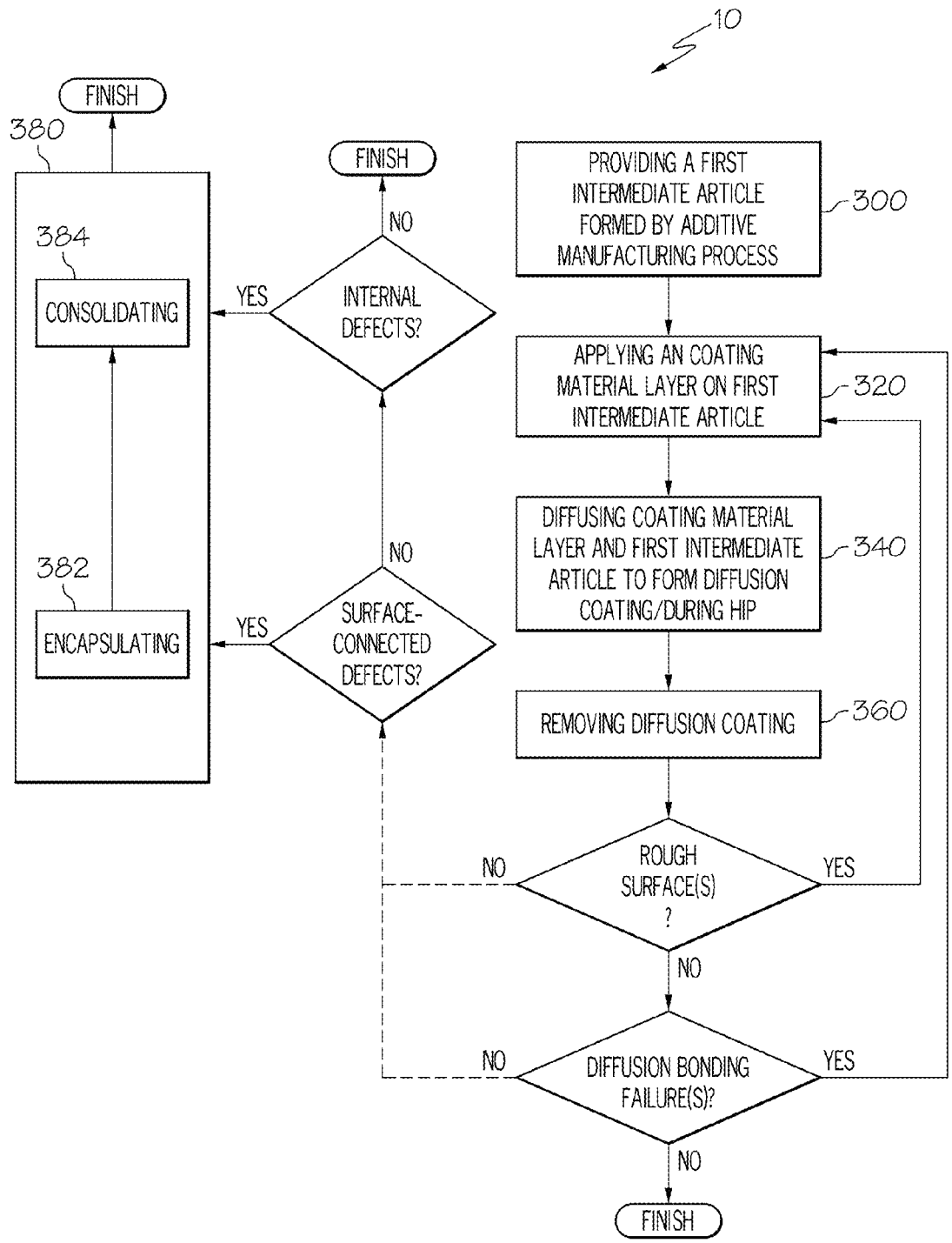
FIG. 3 is a flowchart of a method for manufacturing a component (such as the exemplary turbine component of FIG. 2) from a first intermediate article, according to exemplary embodiments of the present invention.

As shown in FIGS. 2 through 5, in accordance with exemplary embodiments, a method 10 for manufacturing a component, such as the turbine component 200 of FIG. 2, begins by providing a first intermediate article 500 formed by an additive manufacturing process (step 300) (FIG. 3). The first intermediate article 500 may be a first intermediate turbine article adapted to be formed into the turbine component 200. The method 10 includes a number of intermediate stages during manufacture of the component, illustrated in the cross-sectional views of FIGS. 7-11, prior to completion of the finished component, illustrated in FIG. 2 and the cross-sectional view of FIG. 12.

As noted above, Additive Manufacturing (AM) is defined by the American Society for Testing and Materials (ASTM) as the "process of joining materials to make objects from 3D model data, usually deposit layer upon deposit layer, as opposed to subtractive manufacturing methodologies, such as traditional machining and casting." In an additive-manufacturing process, a model, such as a design model, of the component may be defined in any suitable manner. For example, the model may be designed with computer aided design (CAD) software. The model may include 3D numeric coordinates of the entire configuration of the component including both external and internal surfaces of an airfoil, platform and dovetail. The model may include a number of successive 2D cross-sectional slices that together form the 3D component.

Some examples of additive manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one exemplary embodiment, direct metal laser fusion (DMLF) is used to produce the additive-manufactured article. DMLF is a commercially available laser-based rapid prototyping and tooling process by which complex parts may be directly produced by precision melting and solidification of metal powder into successive deposit layers of larger structures, each deposit layer corresponding to a cross-sectional deposit layer of the 3D component. DMLF may include direct metal laser sintering (DMLS). Direct Metal Laser Sintering (DMLS) is an additive manufacturing process that fuses powder metal in progressive deposit layers. With DMLS, the fused sintered powder contains more porosity than DMLF, which in turn may necessitate a HIP process for densification. Other differences may include speed of building the first intermediate article, grain or deposit size, etc.

Figure 4:
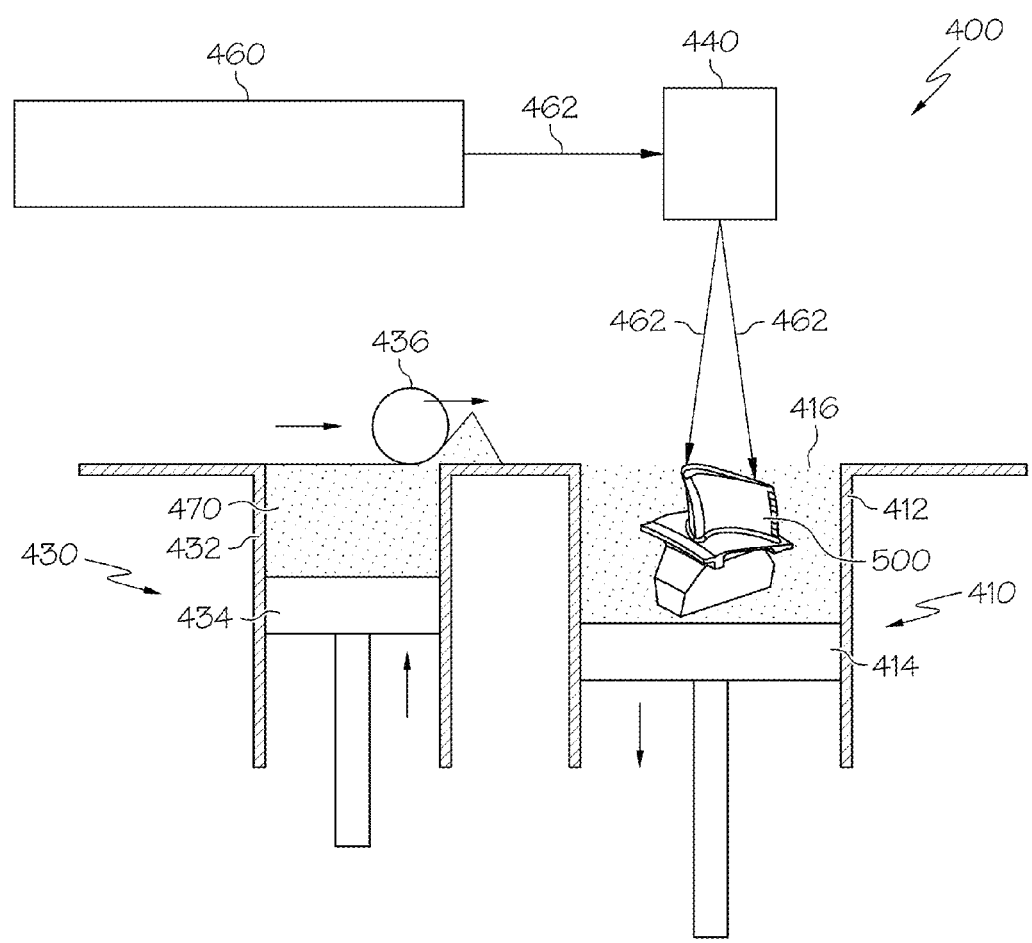
FIG. 4 is an exemplary system for forming an exemplary first intermediate turbine article.
Figure 5:
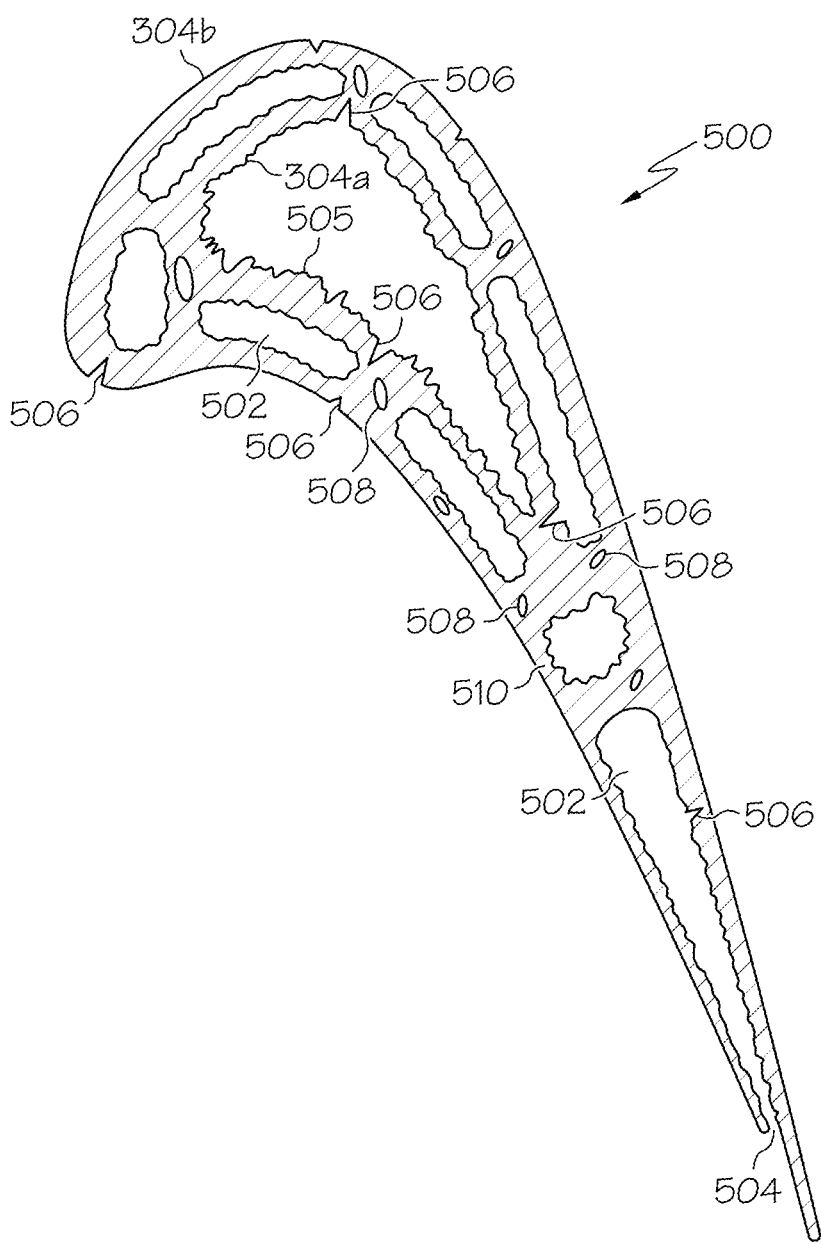
FIG. 5 is a cross-sectional view of an exemplary first intermediate turbine article including a substrate and having a plurality of internal passages, the first intermediate turbine article having internal and surface-connected defects, with a polished external surface and rough internal passage surfaces.

FIG. 4 illustrates an exemplary system 400 for forming the first intermediate article 500 described above and provided in step 300 of method 10. As noted above, the first intermediate article 500 may be the first intermediate turbine article as shown in FIG. 5. As noted above, the system 400 may be an additive manufacturing system such as a DMLS system that includes a fabrication device 410, a powder delivery device 430, a scanner 440, and a laser 460 and functions to produce the first intermediate turbine article 500 from build material 470.

The fabrication device 410 includes a build container 412 with a fabrication support 414 carrying the first intermediate turbine article 500 to be formed from the build material 470. The fabrication support 414 is movable within the build container 412 in a vertical direction and is adjusted in such a way to define a working plane 416. The delivery device 430 includes a powder chamber 432 with a delivery support 434 that supports the build material 470 and is also movable in a vertical direction. The delivery device 430 further includes a roller or wiper 436 that transfers build material 470 from the delivery device 430 to the fabrication device 410.

During operation, the fabrication support 414 is lowered and the delivery support 434 is raised. The roller or wiper 436 scraps or otherwise pushes a portion of the build material 470 from the delivery device 430 to form the working plane 416 in the fabrication device 410. The laser 460 emits a laser beam 462, which is directed by the scanner 440 onto the build material 470 in the working plane 416 to selectively fuse the build material 470 into a cross-sectional deposit layer of the first intermediate turbine article 500. More specifically, the laser beam 462 selectively fuses the powder of the build material 470 into larger structures by rapidly melting the powder particles. As the scanned laser beam 462 moves on, heat is conducted away from the previously melted area, thereby leading to rapid cooling and resolidification. As such, based on the control of the laser beam 462, each deposit layer of build material 470 will include unsintered build material 470 and sintered build material that forms the cross-sectional deposit layer of the first intermediate turbine article 500. Any suitable laser and laser parameters may be used, including considerations with respect to power, laser beam spot size, and scanning velocity.

The first intermediate article article may be manufactured from a build material 470 comprising a superalloy such as a nickel-based superalloy or a cobalt-based superalloy, as well as high temperature stainless steels, titanium, chromium, or other alloys, or a combination thereof Exemplary high temperature, high strength DMLS polycrystalline alloys include a high temperature nickel base superalloy such as MAR-M-247 (also known as MM 247) and IN 718 or IN 738 available (in powder form) from, for example, Allegheny Technologies Incorporated (ATI), Pittsburgh, Pa. Notable substrate materials (for epitaxial deposits include directionally-solidified (DS) alloys such as DS CM247 LC and single-crystal (SX) alloys such as CMSX-486 available (in ingot form) from, for example, the Cannon Muskegon Corporation, Muskegon, Mich. Epitaxial deposits involve fusing the powder and remelting the underlying build material such that during solidification, the deposit takes on the crystallographic orientation of the substrate, ideally a directional solidified polycrystalline or single crystal structure. Nickel and cobalt-based superalloys are most often used to fabricate gas turbine components because of the high strength required for long periods of service at the high temperatures characteristic of turbine operation. The powder build material 470 may be selected for enhanced strength, durability, and useful life, particularly at high temperatures. Each successive deposit layer of the first intermediate article may be, for example, between 10 µm and 200 µm, although the thickness may be selected based on any number of parameters. It is to be understood that for other components not subjected to high temperatures, other build materials may be used in additive-manufacturing processes as known in the art to form the first intermediate article from which the component is manufactured.

Upon completion of a respective deposit layer, the fabrication support 414 is lowered and the delivery support 434 is raised. The roller or wiper 436 again pushes a portion of the build material 470 from the delivery device 430 to form an additional deposit layer of build material 470 on the working plane 416 of the fabrication device 410. The laser beam 462 is again controlled to selectively form another cross-sectional deposit layer of the first intermediate turbine article 500. This process is continued as successive cross-sectional deposit layers are built into the first intermediate turbine article 500. When the laser sintering process is completed, the unsintered build material 470 is removed and the first intermediate article 500 is removed from the fabrication device 410 in anticipation of the subsequent steps discussed below. Although the DMLS process is described herein, other suitable additive manufacturing processes may be employed to fabricate the first intermediate article 500.

Post-laser fusion processing may be performed on the first intermediate article 500 formed by the additive-manufacturing technique. Such post-laser fusion processing may include, for example, stress relief heat treatments, peening, polishing, hot isostatic pressing (HIP), or coatings. In some embodiments, one or more of the post-laser fusion processing steps discussed below are not necessary and may be omitted.

FIG. 5 shows an exemplary first intermediate article 500 (a first intermediate turbine article) formed by an additive manufacturing process, such as the DMLS process described above. According to an exemplary embodiment, a turbine component will be formed from the first intermediate turbine article (also identified with reference numeral "500" for ease of illustration). The first intermediate turbine article 500 includes internal passages 502 such as internal cooling passages such as those in cooled high effectiveness advanced turbine (HEAT) blade and nozzle parts. Such turbine components may be capable of withstanding higher temperatures and stresses, thereby leading to further improvements in engine performance. The cooling passages deliver a cooling flow to the finished turbine component via an inlet (not shown) during engine operation. The cooling flow exits out various cooling holes (not shown) and out the trailing edge exit slot 504. The cooling passages may be relatively complex and intricate for tailoring the use of the limited pressurized cooling air and maximizing the cooling effectiveness thereof and the overall engine efficiency. The internal surfaces 304a of the internal passages 502 ("internal passage surfaces") illustrated in FIG. 5 are rough, being uneven and irregular, such surface roughness indicated with reference character 505. Surface roughness may be caused by contamination, debris, oxidation, or the like. Random near-surface particles (i.e., debris) are identified in FIG. 6 with reference character 507. While not shown, the external surface 304b of the first intermediate article 500 may also exhibit surface roughness.

As a result of the additive manufacturing process, the first intermediate article 500 may include internal passage surface roughness, external surface roughness (external surface roughness not shown in FIG. 5), or both. The first intermediate article 500 may also include surface connected porosity and cracks 506 and internal porosity and cracks 508 within the material substrate 510, as well as interface defects (not shown in FIG. 5) and may not be suitable for use without further processing to reduce or substantially eliminate such defects. The term "porosity" used herein refers to a defect that comprises small spaces or voids within the material substrate 510. The term "cracks" used herein refers to linear defects or voids within the material substrate 510, and includes microcracks. As noted above, the term "surface-connected defects" includes defects (porosity and cracks) at the surface, near surface and subsurface with the cracks having faying surfaces, as noted above.

Figure 6:
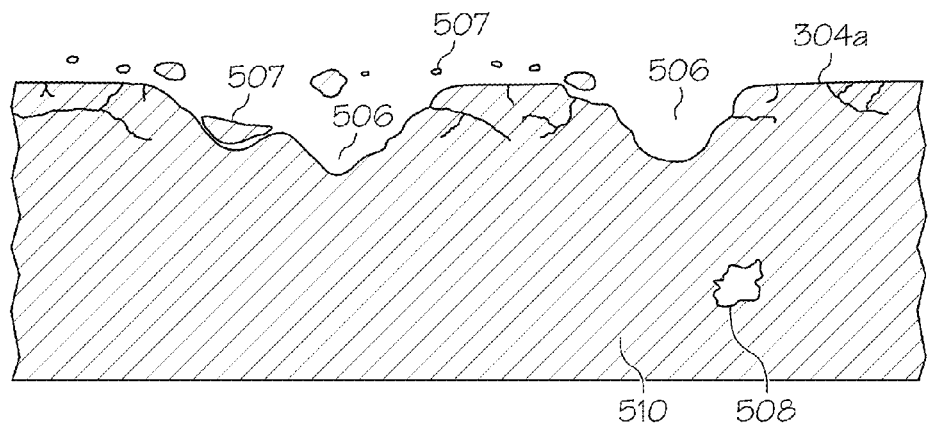
FIG. 6 is a cross-sectional representation of a portion of the substrate of the exemplary first intermediate turbine article of FIG. 5, further illustrating an internal defect and a representative rough internal passage surface having surface-connected defects.

FIG. 6 illustrates a portion of the first intermediate article of FIG. 5, including a portion of the material substrate 510 and a representative rough internal passage surface thereof. The material substrate 510 also includes an exemplary internal defect 508. As noted above, for components with high surface roughness, the structural integrity and mechanical properties thereof may be compromised. In addition, for those components with high surface roughness also needing a reduction in internal and surface-connected defects, surface-connected defects thereof may not be successfully bridged and covered by an encapsulation layer to convert the surface-connected defects into internal defects in preparation for subsequent HIP processing. As noted above, HIP processing reduces or substantially eliminates internal defects.

Figure 7:
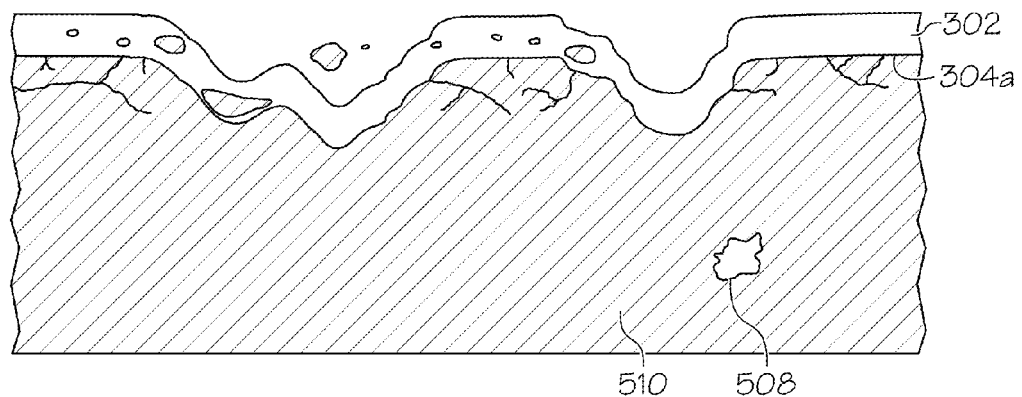
FIG. 7 is a cross-sectional representation similar to FIG. 6 in the method of FIG. 3 in accordance with exemplary embodiments, illustrating a coating material layer on the rough internal passage surface of FIG. 6.
Figure 8:
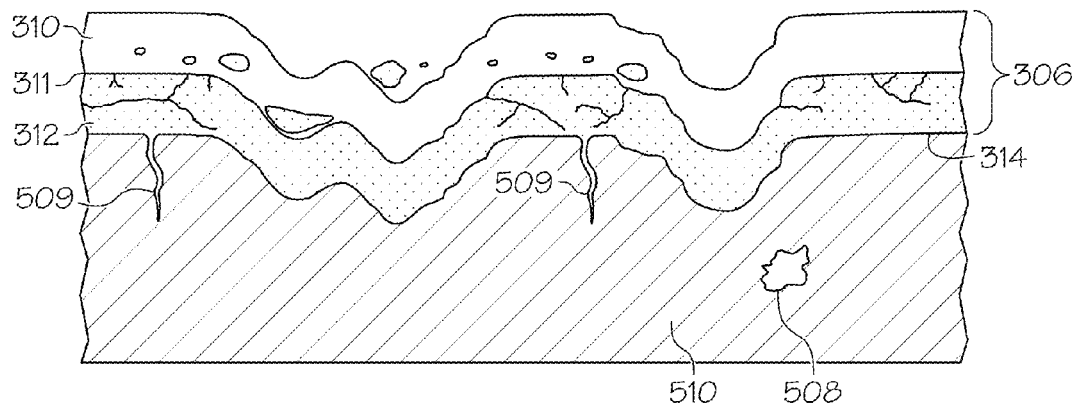
FIG. 8 is a cross-sectional representation similar to FIGS. 6 and 7 in the method of FIG. 3 in accordance with exemplary embodiments, illustrating the coating material layer after diffusion thereof to form a diffusion coating on the representative rough internal passage surface of FIGS. 6 and 7, the diffusion coating including an upper portion of the substrate above a diffusion coating boundary and comprising a surface additive layer and a diffusion layer below the surface additive layer, the surface additive layer and/or the diffusion layer also serving as an encapsulation layer, making subsequent encapsulation in a finishing step unnecessary.
Figure 9:
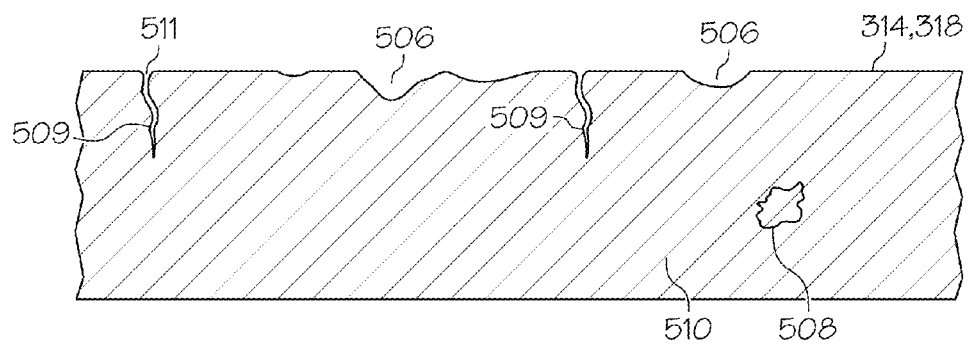
FIG. 9 is a cross-sectional representation similar to FIGS. 6 through 8 in the method of FIG. 3 in accordance with exemplary embodiments after removal of the diffusion coating from the representative rough internal passage surface of the first intermediate article, the diffusion coating boundary forming an enhanced surface on a second intermediate turbine article (shown in FIG. 10), the enhanced surface having reduced surface roughness, the residual surface-connected cracks below the diffusion coating boundary having diffusion bond failures.

FIGS. 7 through 9 are successive cross-sectional views of the method 10 for manufacturing a component, according to exemplary embodiments. The method 10 may be used to reduce surface roughness on first intermediate articles formed by additive manufacturing processes to improve the structural integrity and mechanical properties of the component. The method 10 may also or alternatively be used to improve metallurgical surface integrity of the component.

Referring again to FIGS. 3 and 7, in accordance with exemplary embodiments, method 10 continues by applying a layer 302 of coating material (hereinafter "a coating material layer") on the first intermediate article (step 320). The coating material layer may be, for example, an aluminum-containing coating material layer. The as-applied layer 302 of coating material is ideally metallic and capable of subsequent diffusion into a material substrate 510 of the first intermediate article to form a diffusion coating on the first intermediate article. As illustrated, the coating material may be applied to an internal surface 304a of the first intermediate article to ensure that the coating material layer 302 spans the surface-connected porosity and cracks 506 within, for example, the internal passages 502 (FIG. 5). The coating material may be applied by any known coating techniques such as, for example, chemical vapor deposition, plating, or the like. The coating material is also preferably sufficiently ductile such that it conforms or deforms to the contour of the first intermediate article prior to (during the applying step) and during heating for a hot isostatic pressing (HIP) process step 384, as hereinafter described.

Still referring to FIG. 3 and now to FIG. 8, in accordance with exemplary embodiments, method 10 continues by thereafter diffusion heat treating the first intermediate article 500 and the coating material layer 302 to form the diffusion coating 306 on the first intermediate article (step 340). The diffusion coating 306 comprises a surface additive layer 310 and a diffusion zone or layer 312 below the surface additive layer 310. The surface additive layer 310 is the coating material layer 302 depleted in one or more elements after diffusing into the parent metal of the material substrate 510. Note that in FIG. 8, the random near-surface particles 507 are also part of the diffusion layer 312, which is why they can be subsequently removed as hereinafter described.

Diffusion heat treating may be performed at elevated temperatures of between about 871° C. to about 1093° C. (1600-2000° F.) for about two hours to about twenty hours. In other embodiments, the diffusion heat treatment may occur at a temperature and/or for a time period (duration) outside of the aforementioned ranges. After diffusion heat treating, the second intermediate article may be cooled.

During the applying step 320, if performed at a sufficiently elevated temperature, a primary diffusion zone occurs to some degree between the coating material layer 302 and the substrate 510 as a result of the concentration gradients of the constituents. At elevated temperatures of the diffusion heat treating step 340, further interdiffusion occurs as a result of solid-state diffusion across a coating bond line 311 (FIG. 8). The coating bond line 311 is the demarcation between the applied coating material layer and the substrate 510 of the first intermediate article. The coating bond line 311 is the "edge" of the first intermediate article. When the applied coating material layer is used as an oxidation protective coating, it is important that there be a good bond with the substrate of the first intermediate article at the coating bond line 311 to prevent spalling of the applied coating material layer. The additional migration of elements across the coating bond line 311 in the diffusion heat treating step 340 can sufficiently alter the chemical composition and microstructure of both the diffusion layer 312 and the substrate 510 in the vicinity of a coating diffusion boundary 314. The diffusion zone or layer 312 includes an upper portion of the substrate in the vicinity of the coating bond line 311. The coating diffusion boundary 314 separates the diffusion layer 312 from the material substrate 510 below the coating diffusion boundary 314. As illustrated in FIG. 8, the coating diffusion boundary 314 is relatively smooth compared to the original rough surface 304*a* of the material substrate 510 as illustrated in FIGS. 5 and 6. The coating diffusion boundary should be sufficiently sharp or defined such that removal of the diffusion coating yields a material substrate 510 having a surface composition very close to that of the parent metal before diffusion. The activity of the diffusion process influences the structure of the diffusion coating formed. "Low activity" processes produce "outwardly" diffused coatings where the diffusion coating forms predominately by the outward migration of elements from the substrate and its subsequent reaction with the coating material layer at the surface of the substrate. "High activity" processes produce "inwardly" diffused coatings where the diffusion coating forms predominately by migration of the elements in the coating material layer into the surface of the substrate.

A thickness of the diffusion layer 312 of about 0.2 to about 3 mils is optimal, and corresponds to how much of the upper portion of the substrate of the first intermediate article will be removed in step 360. Internal passage surface diffusion layers are typically much thinner than diffusion layers on external surfaces and steps can be taken to selectively reduce the thickness of the diffusion layer on the external surfaces to arrive at a more even diffusion coating overall to better hold dimensions following removal of the diffusion coating, as hereinafter described. If significant surface roughness and surface-connected defects exist, a thicker diffusion coating may be necessary. The surface additive layer has to be sufficiently thick and continuous to serve as the reservoir for the diffusing element (e.g., aluminum) to diffuse into the substrate, either during step 340 or during step 384.

In accordance with an exemplary embodiment, the diffusion coating may be an aluminide diffusion coating formed by a high activity diffusion coating process. Any aluminizing technique for forming the aluminide diffusion coating is acceptable, for example, a liquid phase slurry aluminizing process, a pack cementation process, a chemical vapor phase aluminizing process, or the like as known in the art. As used herein, an "aluminizing" step comprises applying an aluminum-containing or aluminum-rich coating material layer and diffusion heat treatment thereof The aluminum may be applied using a single deposition process or a combination of processes. For example, formation of the aluminide diffusion coating may be accomplished in an exemplary slurry aluminizing process by heating a slurry coated first intermediate article in a non-reactive environment to a diffusion temperature between about 871° C. to about 1093° C. (1600-2000° F.) for about two to about twenty hours. Suitable non-reactive environments in which the diffusion may be performed include vacuums and inert or reducing atmospheres. Dry argon, hydrogen, dissociated ammonia or mixtures of argon and hydrogen are representative types of gases suitable for use as non-reactive environments. The heating melts the aluminum powder in the slurry and permits the reaction and diffusion of the aluminum into the substrate surface. It has been found that when a slurry coated first intermediate article is heated to temperatures of about 980° C. (1800° F.), the aluminum powder melts and diffuses into the substrate to produce the aluminide diffusion coating, that is, NiAl on a nickel alloy and CoAl on a cobalt alloy, thereby aluminizing the superalloy substrate.

Figure 10:
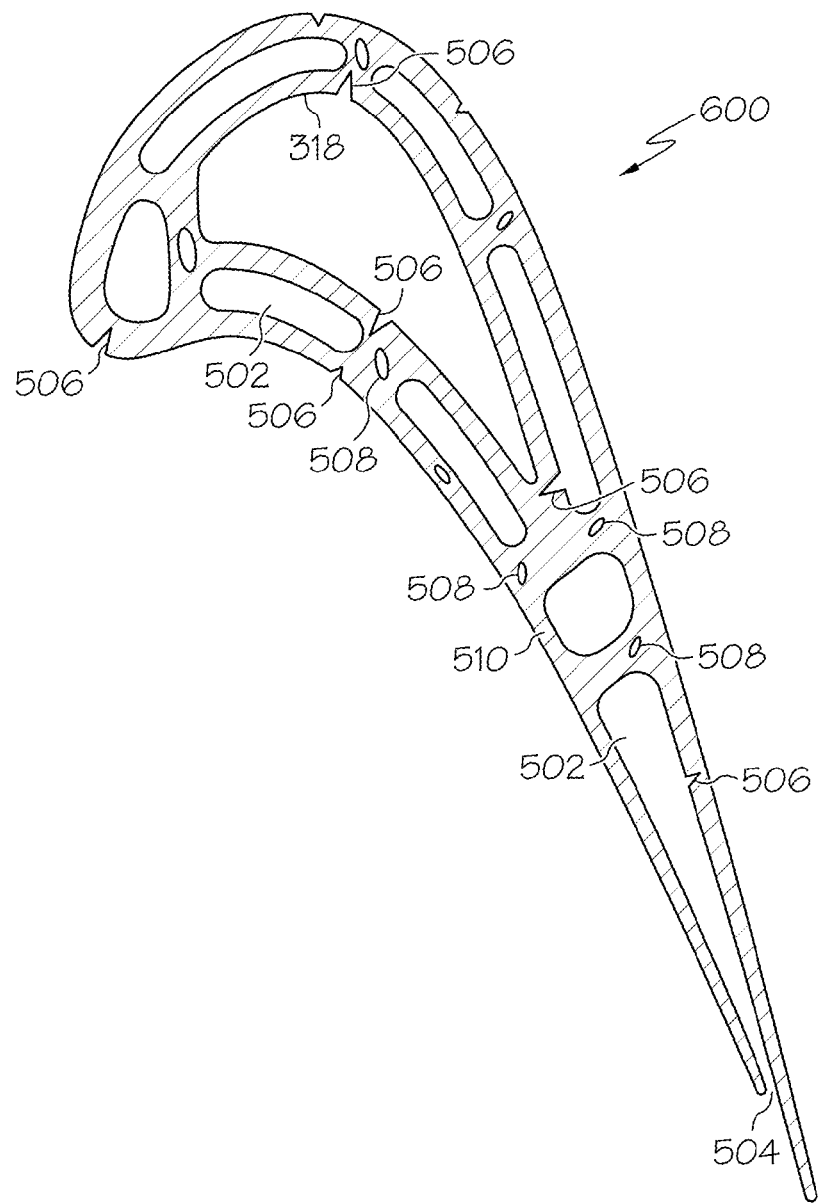
FIG. 10 is a cross-sectional view of a second intermediate turbine article with reduced surface roughness.

Still referring to FIG. 3 and to FIGS. 9-10, according to exemplary embodiments, method 10 continues by removing the diffusion coating 306 (step 360) (also referred to herein as "stripping") to form a second intermediate article 600 (FIG. 10) having at least one enhanced surface 318. The exemplary second intermediate article 600 illustrated in FIG. 10 is a second intermediate turbine article. The layers 310 and 312 of the diffusion coating 306 are substantially removed in their entirety to the coating diffusion boundary 314 thereby forming the at least one enhanced surface 318. In accordance with exemplary embodiments, removal of the diffusion coating 306 removes both the surface additive layer 310 and the diffusion layer 312 under the surface additive layer, including the random near-surface particles 507. As the diffusion layer 312 includes the upper portion of the substrate (the portion of the substrate in the vicinity of the coating bond line 311), the upper portion of the substrate will also be removed. The coating diffusion boundary 314 thus becomes the at least one enhanced surface 318 of the second intermediate article. The diffusion coating and removal steps function to reduce surface roughness, resulting in the second intermediate article having the at least one enhanced surface. The coating diffusion boundary should be sufficiently defined or sharp such that removal of the diffusion coating yields a substrate surface composition very close to that of the original substrate.

The diffusion coating 306 may be removed by any known diffusion coating removal technique. For example, the cooled component may be flushed inside and out in a chemical solvent such as ferric chloride, nitric acid, etc. The chemical solvent is selected for its ability to remove the diffusion coating, without affecting the integrity of the substrate. The coating removal chemical compositions and concentrations may be modified to optimize the amount of diffusion coating removed and/or the removal time while maintaining the integrity of the substrate. The dimensions of the original model for the component may be modified to accommodate removal of the upper portion of the original substrate above the coating diffusion boundary to allow the finished component to meet finished component dimensions.

While reduction of internal passage surface roughness has been described and illustrated, it is to be understood that external surface roughness may be reduced in the same manner. Thus, the coating material layer may be applied on at least one surface of the first intermediate article, the at least one surface being an internal passage surface, an external surface, or both the internal passage surface and the external surface. The at least one enhanced surface may therefore be an enhanced internal passage surface, an enhanced external surface, or both. The external surface of the first intermediate article may not need to be "enhanced" by formation and removal of the diffusion coating (steps 320, 340, and 360), as conventional polishing or mechanical finishing (using abrasive sanding belts, for example) may be more practical to reduce external surface roughness. However, certain component geometries make mechanical finishing costly or impractical. For example, for the turbine article shown in the image of FIG. 15, polishing or mechanical finishing of the external surface was practical, but for other more complex external geometries, it may be better to use steps 320, 340, and 360 to enhance the external surface. Conventional polishing and formation and removal of the diffusion coating may also be performed, according to exemplary embodiments. The internal passage surface roughness may be reduced before, concurrently, or after external surface roughness is reduced.

If there is residual surface roughness or surfaces with inadequate diffusion bonded faying surfaces ("diffusion bonding failures"), forming of the diffusion coating (applying and diffusion heat treating steps) and removal thereof (hereinafter collectively a "forming and removing cycle") may optionally be repeated as many times as necessary until the at least one surface of the article is sufficiently enhanced, the sufficiency thereof known to one skilled in the art. As noted above, the term "enhanced" or the like refers to a reduction in surface roughness and/or improvement in metallurgical quality. The improvement in metallurgical quality results from removing surfaces lacking sufficient metallurgical surface integrity caused by inadequately metallurgically diffusion bonded faying surfaces of the surface-connected cracks. For example, referring to FIGS. 8 and 9, while surface roughness has been reduced by at least one forming and removing cycle, residual surface-connected cracks 509 having inadequately diffusion bonded faying surfaces 511 are still present, extending deeper into the surface of the material substrate 510 below the coating diffusion boundary 314. Thus, additional forming and removing cycles are needed to remove the affected surface(s) to improve the metallurgical quality of the component.

For some components exposed to low operating stresses, it may be sufficient to reduce surface roughness by performing steps 320, 340, and 360 at least once without further processing. That is, if the surface finish is sufficient, the process is finished. If the surface finish is insufficient, steps 320, 340, and 360 may be repeated. However, for other environments, concerns about surface-connected defects and internal defects may be relevant. In accordance with exemplary embodiments, as illustrated in FIG. 3, surface roughness may be reduced concurrently with converting surface-connected defects in the first intermediate article into internal defects and/or concurrently with reducing or eliminating internal defects therein. In an embodiment, the coating material layer 302 applied in step 320 and diffused in step 340 to form the surface additive layer and the diffusion layer of the diffusion coating may also serve as an encapsulation layer. An encapsulation layer functions to effectively convert the surface-connected defects 506 into internal defects 508. In this case, as hereinafter described, no subsequent encapsulation 382 in a finishing step 380 as hereinafter described may be necessary.

To reduce or eliminate internal defects in the first intermediate article, a hot isostatic pressing (HIP) process or other consolidation process may be performed concurrently with the diffusion heat treating step 340, as the heating during the HIP process results in both interdiffusing the substrate and the coating material layer to form the diffusion coating and consolidation of the first intermediate article to reduce or substantially eliminate internal defects. In this case, no subsequent consolidation or HIP processing 384 in the finishing step 380 may be necessary. Thus, if the only issue is surface roughness and/or diffusion bonding failures, or if the surface roughness is reduced concurrently with converting surface-connected defects and reducing or eliminating internal defects, the method does not proceed to steps 380, 382, and/or 384 as shown by the dotted lines in FIG. 3.

In the hot isostatic pressing (HIP) process, the article is subjected to elevated temperatures and pressures over time. In general, the HIP process will not reduce defects such as porosity or cracks that are connected to the surface of the component. As noted above, HIP processing reduces or substantially eliminates internal defects. The HIP process may be performed at any temperature, pressure, and time that are suitable for forming a compacted solid having minor or acceptable levels of porosity. For example, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be higher or lower to form a compacted article having negligible cracks and porosity. The consolidated article may comprise the finished component.

While the HIP process on the first intermediate article is described and illustrated as being performed after encapsulation, it is to be understood that the HIP process on the first intermediate article may be performed without prior encapsulation. It is also to be understood that the HIP process may be performed anytime, in order to reduce or substantially eliminate internal defects.

Figure 12:
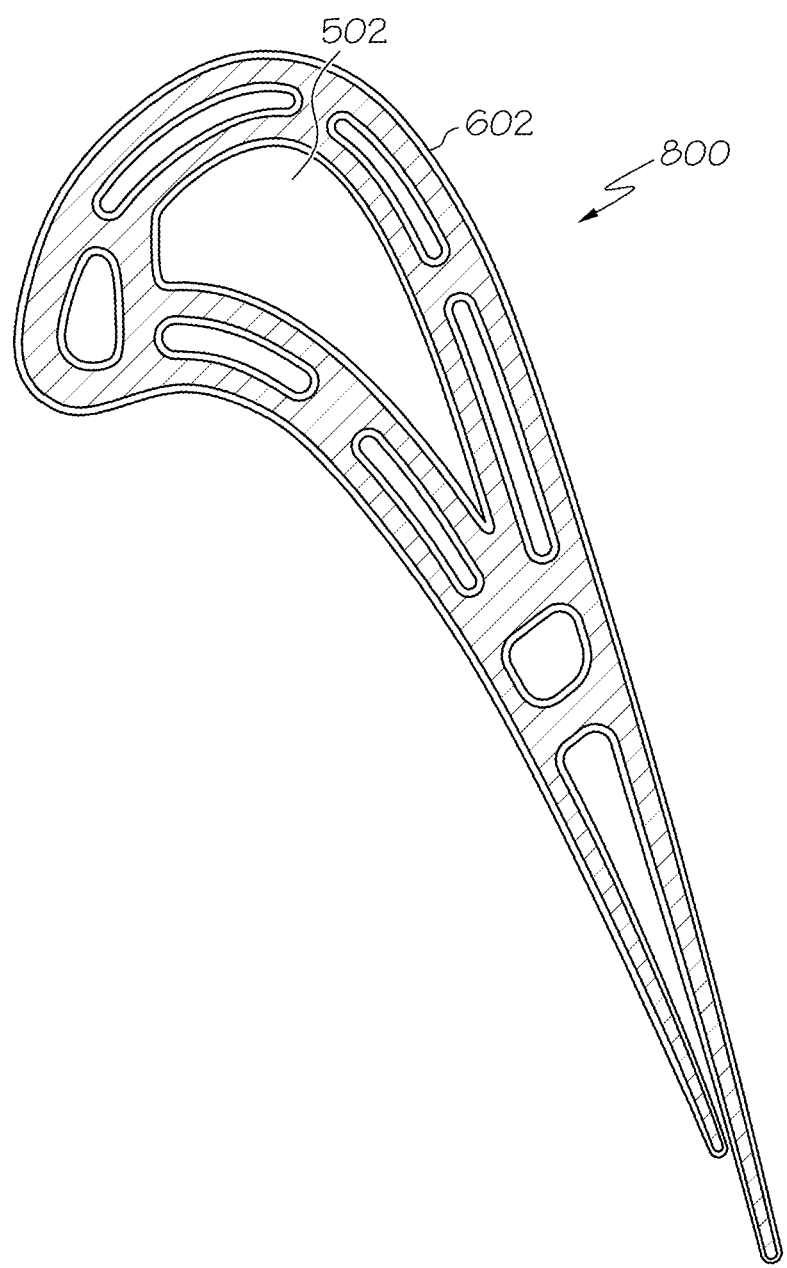
FIG. 12 is a cross-sectional view of a consolidated turbine article after HIP processing of the encapsulated article of FIG. 11 to reduce or eliminate the internal defects in the method of FIG. 3 in accordance with exemplary embodiments.
Figure 13:
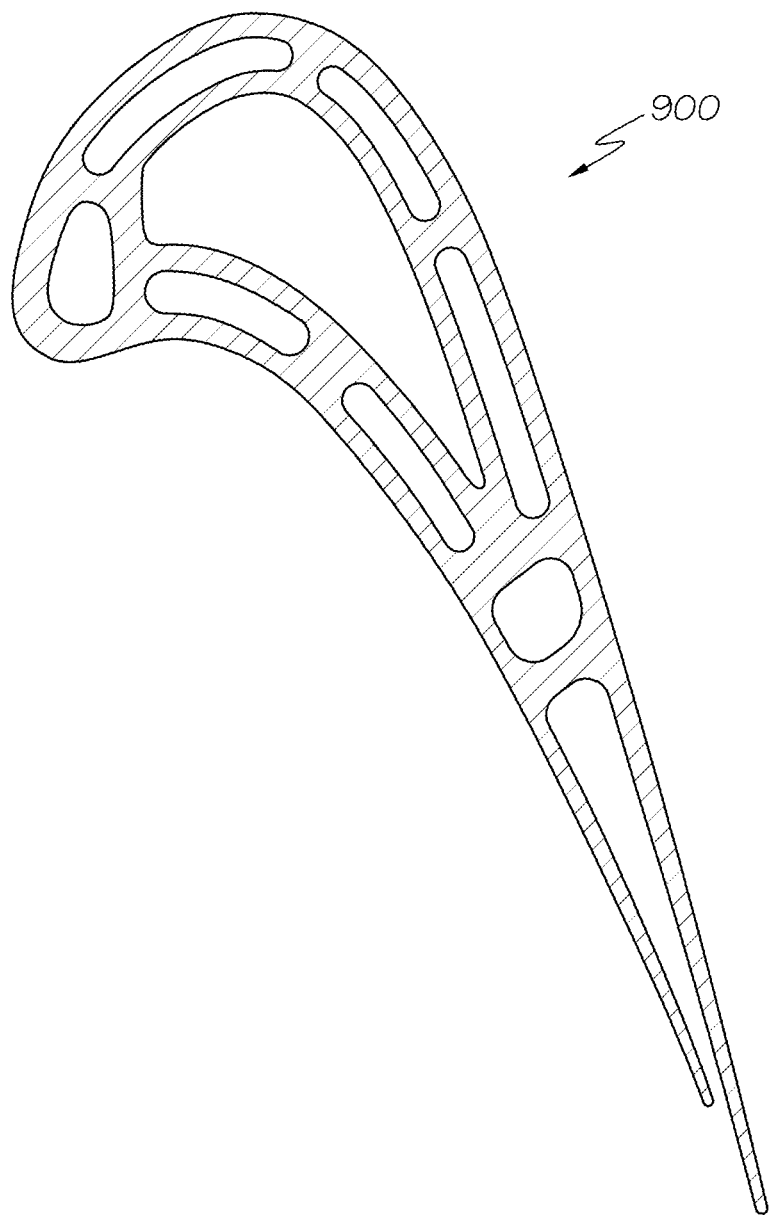
FIG. 13 is a cross-sectional view of a finished turbine component in the method of FIG. 3 after removal of the encapsulation layer from the consolidated turbine article of FIG. 12 in accordance with exemplary embodiments.

In other embodiments, converting the surface-connected defects into internal defects in preparation for HIP processing and/or HIP processing of the second intermediate article 600 may occur after the surface roughness has been reduced. Referring again to FIG. 3 and to FIGS. 11-13, in accordance with an exemplary embodiment, method 10 continues by optionally finishing the second intermediate article 600 (FIG. 10) (the second intermediate turbine article) to produce the finished component 900 (step 380). The encapsulation and consolidation by a HIP process during finishing step 380 is used when a decision is made to use a non-diffusion coating on an improved surface article. That might be the case where the first HIP process (e.g., in step 340) is intentionally or unintentionally limited in its effectiveness to consolidate and heal internal defects. Also, should the thickness of the article be too thin, one might not want to risk further thinning as would happen if a diffusion coating was applied. Thus, step 380 offers an encapsulation process for HIP with a minimal loss of thickness. Step 380 does not exclude repeating steps 320, 340, and 360 if necessary to further improve the metallurgical surface quality of the article. The exemplary finished component illustrated in FIG. 13 is a finished turbine component in which internal passage surface roughness has been reduced, and the surface-connected defects and internal defects have been reduced or substantially eliminated (no interface defects shown in FIGS. 5-11). In some exemplary embodiments as noted above, no such finishing treatments are necessary and step 380 may be omitted. In step 380, the second intermediate article 600 may undergo further processing including finishing treatments. Such treatments may include, for example, aging, solutioning, annealing, quenching, peening, polishing, hot isostatic pressing (HIP), or coatings, such as bond coatings, thermal barrier coatings, or the like. Although step 380 is referred to as a finishing treatment, such treatments may be used at other times, as hereinafter described. As one example, surface peening or polishing of the external surface may be provided before, during, or after reducing the surface roughness of the internal passage surface(s).

Figure 11:
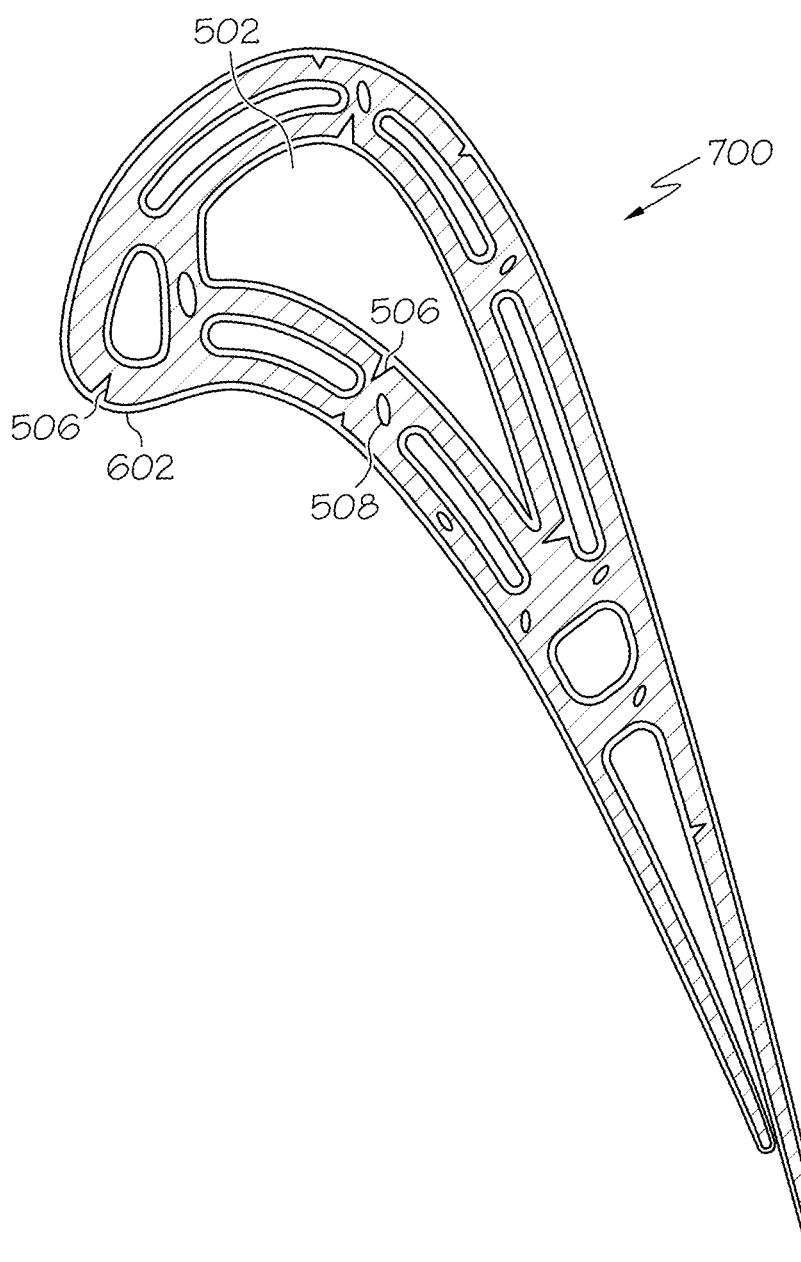
FIG. 11 is a cross-sectional view of the second intermediate turbine article of FIG. 10 after encapsulation in a finishing step to form an encapsulated article, in the method of FIG. 3 in accordance with exemplary embodiments.

Examples of a finishing treatment of step 380 are discussed below with reference to FIGS. 11 and 12. FIGS. 11 and 12 are successive cross-sectional views of the step 380 applied to the second intermediate turbine article 600 (FIG. 10) after removal of the diffusion coating 306 in step 360. Referring now to FIG. 11, the second intermediate turbine article of FIG. 10 is shown encapsulated with an encapsulation layer 602 forming an encapsulated article 700. Encapsulation layer 602 refers to an encapsulation layer formed during the finishing step 380. The encapsulation layer 602 also functions to effectively convert the surface porosity and cracks 506 into internal porosity and cracks 508. For example, the surface porosity and cracks 506 of FIG. 5 are effectively internal porosity and cracks 508 in FIG. 11 as a result of the encapsulation layer 602. Any suitable encapsulation process may be performed that bridges and covers the porosity and cracks in the at least one surface of the article. For example, the encapsulation layer 602 may have a thickness of approximately 10-100 µm, although any suitable thickness may be provided. Such encapsulation layer may be subsequently removed (See FIG. 13) or maintained to function as an oxidation protection layer. The encapsulation layer may be a metal or alloy that is compatible with the substrate material and may be formed, for example, by a plating process or a coating process, as hereinafter described. In various exemplary embodiments, the encapsulation layer 602 of finishing step 380 may be formed for example, by electroless plating or electroplating processes. In further embodiments, the encapsulation layer may be formed by processes including cobalt plating, sol-gel chemical deposition techniques, or low pressure plasma sprays. A suitable material for the encapsulation layer is one which when applied or when heated to the HIP temperature is relatively ductile and free of gaps or cracks and which spans the surface-connected porosity and cracks 506 within, for example, the internal passages 502. As noted above, other examples of suitable encapsulation layers 602 include an aluminide diffusion coating or other diffusion coating.

Referring now to FIG. 12, another exemplary finishing treatment of step 380 includes consolidating the second intermediate article and the encapsulation layer by, for example, the hot isostatic pressing (HIP) process (step 384) in which the article is subjected to elevated temperatures and pressures over time to form a consolidated article 800. The encapsulation layer 602 provided in FIG. 11 (or the encapsulation layer provided by steps 320 and 340) functions to internalize any such surface connected defects (e.g., surface connected porosity and cracks) such that the HIP process is effective for all or substantially all of the internal cracks or porosity in the material substrate 510, including cracks and porosity that would otherwise be surface porosity and cracks 506 as illustrated in FIG. 10. The consolidated article may comprise the finished component. While the HIP process of the finishing step 380 is also described and illustrated as being performed after encapsulation, it is to be understood that the HIP process 384 may be performed without prior encapsulation. Again, it is to be understood that the HIP process may be performed anytime, in order to reduce or substantially eliminate internal defects.

While the method illustrated in FIG. 3 involves four decision questions, it should be understood that not all the decision questions necessarily apply in the manufacture of a particular component. For example, if only surface roughness or diffusion bonding failure is of concern, the method may stop after steps 320, 340, and 360 have been performed at least one time. If internal defects are the only concern, consolidation (step 384) only may be performed.

Returning again to FIG. 3, upon completion of step 360 or step 380, the component produced in accordance with exemplary embodiments, may be machined to the final specifications. The machining techniques for a turbine component may include, for example, the addition of a tip cap, formation of cooling holes, and grinding the rotor tips as known in the art. At this point, the turbine component 900 in FIG. 13 corresponds to the completed turbine component 200 shown in FIG. 2. The completed component may be positioned for its intended use. For example, a completed turbine component may be installed in a turbine section of the gas turbine engine as shown in FIG. 1.

EXAMPLE

Figure 14:
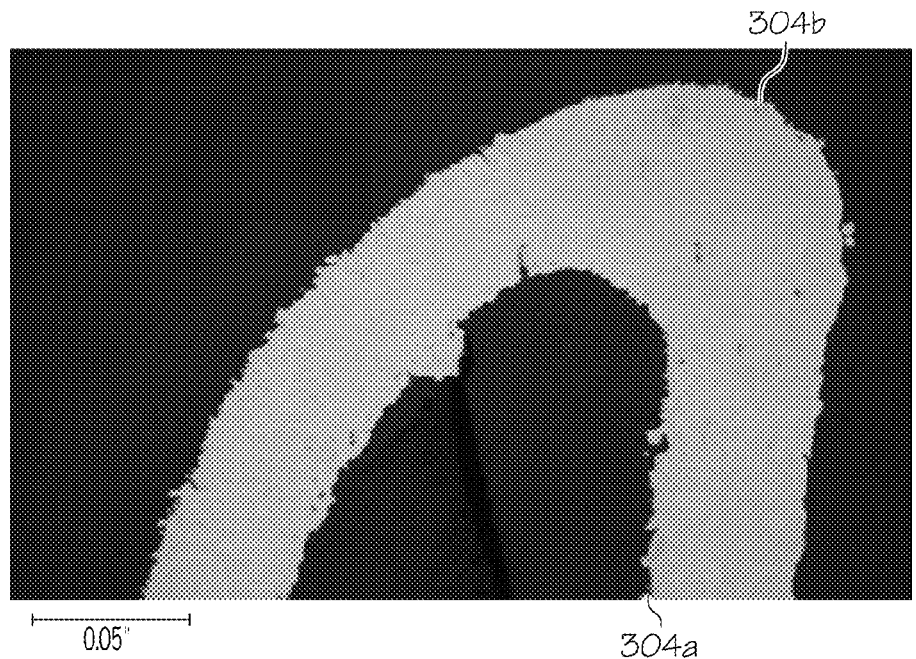
FIG. 14 is an image of an exemplary as-built high pressure (HP) turbine blade (an exemplary first intermediate article) formed from a DMLS additive manufacturing process, illustrating a rough internal passage surface and a rough external surface.
Figure 15:
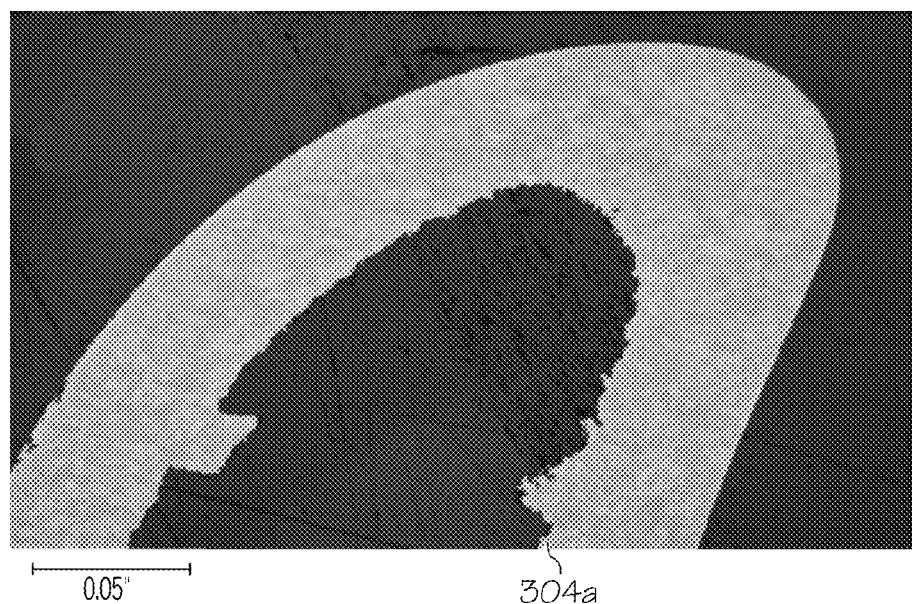
FIG. 15 is an image of the as-built HP turbine blade of FIG. 14 after encapsulating and HIP processing of a polished external surface and rough internal passage surfaces, illustrating residual internal surface roughness and surface-connected defects.

The following example is provided for illustration purposes only, and is not meant to limit the various embodiments of the present invention in any way. In the following example, an aluminide diffusion coating is formed on an internal surface of an exemplary turbine article (an HP turbine blade) formed from a DMLS additive manufacturing process using high temperature, high strength nickel-based superalloys (MM247 and IN738), in accordance with exemplary embodiments. FIGS. 14-17 are images of the exemplary turbine article or portions thereof As shown in FIG. 14, the turbine article has both internal passage surface roughness and defects (the internal surface referred to by reference element 304a) and external surface (304b) roughness and defects. FIG. 15 is an image of the turbine article of FIG. 14 after encapsulation and HIP processing. The external surface 304b was conventionally polished prior to encapsulation and HIP processing to eliminate the external surface roughness and defects. However, the internal passage surface of the turbine article of FIG. 15 still has significant surface roughness and surface-connected defects, even after encapsulation and HIP processing, as shown more clearly in the image of FIG. 16. FIG. 17 is an image of a portion of the turbine article after forming an aluminide diffusion coating on the internal surface, illustrating a relatively smooth coating diffusion boundary 314. The aluminide diffusion coating of FIG. 17 was prepared according to the steps described above using a chemical vapor deposition aluminizing process performed at between 1950° F. to 2000° F. for two to four hours. The aluminide diffusion coating of FIG. 17 was formed according to steps 320 and 340 (FIG. 3) and pictorially illustrated in FIGS. 7 and 8. The aluminide diffusion coating formed a sharp (i.e., clearly defined) coating diffusion boundary 314. While not shown in the images, the aluminide diffusion coating will be subsequently removed to the coating diffusion boundary 314 forming the second intermediate turbine article 600 (FIG. 10) having at least one enhanced surface 318. The enhanced surface 318 of the second intermediate article will have a surface composition very close to that of the material substrate 510. The second intermediate article may comprise the turbine component or be finished or completed as described above.

Accordingly, methods in accordance with exemplary embodiments may reduce surface roughness and/or improve metallurgical quality of articles formed by additive manufacturing processes. These methods yield components with improved overall structural integrity, cosmetic appearance, functionality, mechanical properties, and fatigue life/strength. Exemplary embodiments also reduce or substantially eliminate surface-connected and internal defects of the articles. These methods also improve yield and enable improved development cycle times and reduced tooling costs associated with component manufacturing without sacrificing component performance or durability. Additionally, these methods permit internal configurations for components not otherwise possible with conventional fabrication technologies, without elaborate tooling.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for manufacturing a component, the method comprising the steps of:
   forming a diffusion coating on a first intermediate article formed by an additive manufacturing process; and
   removing the diffusion coating from the first intermediate article forming a second intermediate article having at least one enhanced surface.

2. The method of claim 1, wherein the step of forming a diffusion coating comprises:
   applying a layer of coating material on at least one surface of the first intermediate article;
   diffusion heat treating the first intermediate article and the layer, the diffusion coating comprising a surface additive layer and a diffusion layer below the surface additive layer.

3. The method of claim 1, further comprising the step of:
   repeating the forming and removing steps at least once.

4. The method of claim 2, wherein applying the layer of coating material on the at least one surface comprises applying the layer of coating material on an internal passage surface, an external surface, or both the internal passage surface and the external surface of the first intermediate article.

5. The method of claim 2, further comprising the step of consolidating the first intermediate article by a hot isostatic pressing (HIP) process concurrently with the step of diffusion heat treating.

6. The method of claim 2, wherein the step of forming a diffusion coating on a first intermediate article provides an encapsulation layer on the first intermediate article, the encapsulation layer comprising the surface additive layer, the diffusion layer, or both the surface additive layer and the diffusion layer.

7. The method of claim 6, further comprising the step of consolidating the first intermediate article by a hot isostatic pressing (HIP) process concurrently with the step of diffusion heat treating or the second intermediate article by the hot isostatic pressing (HIP) process.

8. The method of claim 1, further comprising the step of consolidating the second intermediate article by a hot isostatic pressing (HIP) process.

9. The method of claim 8, further comprising the steps of:
   encapsulating the second intermediate article with an encapsulation layer to form an encapsulated article prior to the step of consolidating the second intermediate article; and
   optionally removing the encapsulation layer after the consolidating step.

10. The method of claim 2, wherein the diffusion layer includes an upper portion of a substrate of the first intermediate article and wherein the step of removing a diffusion coating additionally removes the upper portion of the substrate to a coating diffusion boundary defining the at least one enhanced surface of the second intermediate article.

11. A method for manufacturing a component from a first intermediate article formed by an additive manufacturing process, the method comprising:
   applying a coating material layer on at least one surface of the first intermediate article;
   diffusion heat treating the first intermediate article and the coating material layer to form a diffusion coating on the first intermediate article, the diffusion coating comprising a surface additive layer and a diffusion layer below the surface additive layer, the diffusion layer including an upper portion of a substrate of the first intermediate article;
   removing the diffusion coating including the upper portion of the substrate from the first intermediate article forming a second intermediate article having at least one enhanced surface; and
   optionally repeating the applying, diffusion heat treating, and removing steps at least once.

12. The method of claim 11, wherein the step of applying a coating material layer on at least one surface of the first intermediate article comprises applying the coating material layer on an internal passage surface, an external surface, or on both the internal passage surface and the external surface.

13. The method of claim 11, wherein the step of optionally repeating the applying, diffusion heat treating, and removing steps is performed to reduce residual surface roughness of the second intermediate article, to reduce residual surface-connected cracks with diffusion bond failures in the second intermediate article, or both.

14. The method of claim 11, further comprising the step of consolidating the first intermediate article by a hot isostatic pressing (HIP) process concurrently with the step of diffusion heat treating.

15. The method of claim 11, wherein the steps of applying and diffusion heat treating provide an encapsulation layer on the first intermediate article, the encapsulation layer comprising the surface additive layer, the diffusion layer, or both the surface additive layer and the diffusion layer, the method further comprising the step of consolidating the first intermediate article by a hot isostatic pressing (HIP) process concurrently with the step of diffusion heat treating or the second intermediate article by the hot isostatic pressing (HIP) process.

16. The method of claim 11, further comprising the step of consolidating the second intermediate article by a hot isostatic pressing (HIP) process.

17. The method of claim 16, further comprising the steps of:
   encapsulating the second intermediate article with an encapsulation layer to form an encapsulated article prior to the step of consolidating the second intermediate article; and
   optionally removing the encapsulation layer after the consolidating step.

18. A method for manufacturing a component from a first intermediate article formed by an additive-manufacturing process, the first intermediate article comprised of a substrate and having at least one surface, the method comprising:
   applying an aluminum-containing coating material layer on the at least one surface, the substrate comprising a nickel-based superalloy;
   diffusion heat treating the first intermediate article and the aluminum-containing coating material layer to yield an aluminide diffusion coating on the first intermediate article, the aluminide diffusion coating comprising an aluminum-rich surface additive layer and a diffusion layer below the aluminum-rich surface additive layer, the diffusion layer including an upper portion of the substrate;

removing the aluminide diffusion coating from the first intermediate article thereby forming a second intermediate article having at least one enhanced surface; and optionally repeating the applying, diffusion heat treating, and removing steps at least once.

19. The method of claim 18, further comprising a step of finishing the second intermediate article to produce the component.

20. The method of claim 18, wherein the first intermediate article comprises a first intermediate turbine article and the at least one surface comprises an internal passage surface of at least one cooling passage of a turbine component, an external surface of the turbine component, or both.

* * * * *